United States Patent
Schuler et al.

(10) Patent No.: US 8,910,866 B2
(45) Date of Patent: Dec. 16, 2014

(54) CODE READER AND METHOD FOR THE ONLINE VERIFICATION OF A CODE

(71) Applicant: Sick AG, Waldkirch (DE)

(72) Inventors: Pascal Schuler, Waldkirch (DE); Dietram Rinklin, Waldkirch (DE); Sascha Burghardt, Waldkirch (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 13/922,570

(22) Filed: Jun. 20, 2013

(65) Prior Publication Data
US 2013/0341397 A1    Dec. 26, 2013

(30) Foreign Application Priority Data

Jun. 22, 2012    (EP) ..................... 12173212

(51) Int. Cl.
*G06K 5/00* (2006.01)
*G06T 5/00* (2006.01)
*G06K 7/14* (2006.01)

(52) U.S. Cl.
CPC . *G06K 5/00* (2013.01); *G06T 5/006* (2013.01); *G06T 5/008* (2013.01); *G06K 7/1478* (2013.01); *G06K 7/146* (2013.01)
USPC ....................................................... 235/437

(58) Field of Classification Search
USPC .......................................... 235/375, 435, 437
See application file for complete search history.

(56) References Cited

U.S. PATENT DOCUMENTS

| | | | |
|---|---|---|---|
| 6,758,399 B1 | 7/2004 | Brunelli et al. | |
| 2003/0116628 A1 | 6/2003 | Nakazawa et al. | |
| 2012/0018518 A1* | 1/2012 | Strom et al. | 235/462.04 |
| 2012/0091204 A1* | 4/2012 | Shi | 235/437 |

FOREIGN PATENT DOCUMENTS

| | | |
|---|---|---|
| DE | 102009021231 A1 | 11/2010 |
| EP | 1379075 A1 | 1/2004 |

OTHER PUBLICATIONS

IDAutomation 2D USB Barcode Scanner, May 12, 2011; (URL: http://www.idautomation.com/scanners/2d-usb-barcode-scanner.html (retrieved on Sep. 20, 2012)).
User's Guide; Quick Check 2D Print Quality Assessment; 2002-2006 Hand Held Products, Inc.
Office Action issued in corresponding European Application No. 12173212.7 dated Mar. 7, 2014.
Siemens Operating Manual, SIMATIC Indent, Code Reader Systems, SIMATIC MV420/SIMATIC MV440, Operating Instructions, Apr. 2011, A5E02371045-04.

\* cited by examiner

*Primary Examiner* — Christle I Marshall
(74) *Attorney, Agent, or Firm* — Nath, Goldberg & Meyer; Jerald L. Meyer

(57) ABSTRACT

A code reader (10) having an image sensor (20) for the generation of images of a detection zone (12) resolved into pixels is provided having a decoding unit (24) in order to identify code regions (14) in the images and to readout their coded information, as well as having a verification unit (28) for evaluating the code quality in accordance with predefined criteria. In this connection the verification (28) is configured to initially generate a normalized verification image of the code from the code regions (14) by means of image processing for the verification.

17 Claims, 2 Drawing Sheets

CODE READER AND METHOD FOR THE ONLINE VERIFICATION OF A CODE

Figure 1:
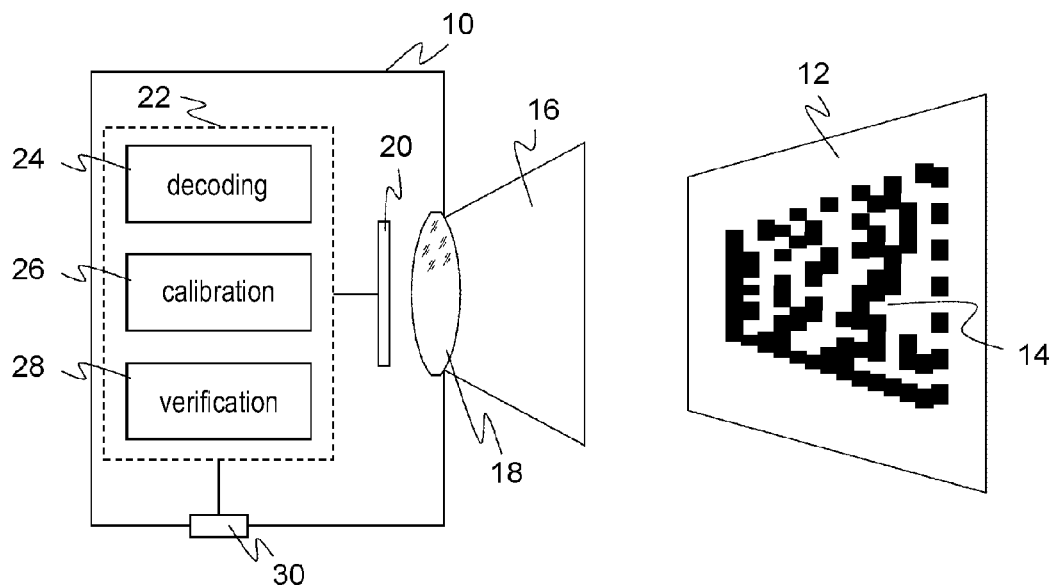

The invention relates to a code reader having an image sensor for the generation of images of a detection zone resolved in pixels, as well as to a method for the online verification of a code in accordance with the preamble of claim 1 or claim 15 respectively.

With the further development of digital camera technology camera-based systems are increasingly taking over from the still widely used barcode scanner which scans a barcode, by means of a reading beam, transverse to the code. Code readers are, for example, used at grocery store cash desks, for automatic package identification, for sorting of post or package handling in airports and in other logistical applications.

A camera-based code reader takes images of the articles having the codes present thereon with the aid of a pixel resolved image sensor, rather than scanning code regions. Subsequently an image evaluation software extracts the code information from these images. Camera-based code readers also cope with other code types other than one-dimensional line codes, which other code types are also built-up two-dimensionally like a matrix code and provide more information.

In order to ensure high reading rates also the quality control of codes is important. Only through a sufficiently high code quality can a successful decoding be achieved at the different code reading positions with possibly different code reading systems. The evaluation of the code quality is also referred to as code verification. This is not primarily concerned with how the content of a code is readout and how it is further processed, but rather with checking certain code properties which are required for the code reading. This process can include a decoding whose result can, however, already be known in advance and should merely be confirmed. Quality standards such as in the ISO 16022 or the ISO 15415 have been agreed upon for the code.

Typically a code verification takes place in an offline mode in which certain physical boundary conditions are predefined. The code verification should be reproducible and reliably evaluate the Examinee and not artifacts of the camera setup, such as detection angle, selected image amplification or illumination time. For this purpose, quite precise specifications are made with regard to the reading situation during the verification. For example, a code verification in the image center is suggested in order to avoid boundary losses of the lens and for this purpose a target marking is predefined with respect to where the examinee should be placed.

A known norm illumination without interference light from one or more known directions, frequently a plurality of also periodically recurring calibration cycles, a fixed and non-changeable reading distance between Examinee and the lens and totally the specification of a defined detection position, both with regard to the position of the code reader and also of the code to be examined are considered as a part of the boundary conditions to be recorded. Such boundary conditions can practically not be satisfied under real conditions during the online use. Moreover, one wants to make the assembly of the code reader dependent on the requirements of the application and not of artificial specifications of the code verification.

Due to the contradictory requirements and the large demand for the securing of standardized reading conditions, verification devices for quality control of printed or impressed codes are only suitable for the laboratory operation. This has the effect that the Examinee has to be taken out of the production line and examined offline for verification. Also mobile verification devices do not sufficiently overcome this problem, since they do indeed reduce the path length, but still require the extraction of random samples. In this way the processes are not only impaired but also the reaction times due to a degradation of the code quality are increased. Until the result of a manual code verification has been determined following the extraction of the Examinees products can be brought into circulation for which a required code quality cannot be ensured. In downstream process chains and distribution chains problems can thereby possibly arise at diverse reading stations. The technical effort which has to be undertaken for the maintenance of physical boundary conditions, moreover leads to relatively high costs of verification devices.

Common verification devices are thus not suitable for the online use, this means the actual code reading at the position of application. They are too inflexible for this purpose, to expensive and frequently also too slow. However, code readers are conversely also not suitable for the verification during online use. This because the standardized conditions for a code verification are generally not satisfied, so that artifacts of the camera setup would distort the result. Furthermore, the decoding times must be maintained so that the code reader can detect and decode codes at the frequency determined by the application. The calculation capacity and architecture of code readers is not designed to carry out a time-consuming verification in addition to this. The standards partly require a multiple reading for a code verification and in this way an even larger demand in effort and cost.

Generally it is commonly not possible to carry out a code verification in the normal online decoding mode of operation.

The U.S. Pat. No. 6,758,399 A1 describes a rectification of the optical code reading. Columns and rows of the recorded code are examined and the image is transformed so that the rows and columns lie perpendicular and horizontal respectively. Further corrections do not take place and a code verification is not provided.

In the EP 1 379 075 A1 the image is corrected in order to compensate the boundary loss discussed a multiple of times. In this connection pixels are brightened in accordance with their distance to central reference pixels.

For this reason, it is the object of the invention to simplify the code verification.

This object is satisfied by a code reader having an image sensor for the generation of images of a detection zone resolved in pixels, as well as by a method for online verification of a code in accordance with claim 1 and claim 15 respectively. In this connection the invention is based on the basic idea of reversing the typical procedure on a code verification. Instead of ensuring fixed physical boundary conditions in accordance with standards, the given conditions at the place of use are accepted as they are and, for example, from the requirements of the application. The standardized conditions are then brought about retrospectively by image processing. In this connection a normalized verification image arises by means of which its code quality is evaluated. This evaluation frequently has the aim to classify the code with respect to different quality criteria predefined by standards and/or to ensure that a code has at least a predefined code quality.

The invention has the advantage that a comparable quality control of codes is achieved in accordance with accepted norms and also in the common online mode of operation for the reading of codes on assembly at the position of application in comparison to common offline verification devices. In this connection the results are preferably achieved at so-called ISO certified compliance test cards. The code reader thus simultaneously serves for the reading and for the verification of the codes and in this connection is more cost-effective and flexible than a common verification device. Through the integration of the code verification into the reading operation the requirement is omitted to remove Examinees from the process. Measures for the maintenance of physical boundary conditions for the code verification are no longer required, such as a norm illumination rather than a typically integrated reading illumination, exchangable lenses, fixed reading distances or inclination angles of illumination or image sensor with respect to the object plane of the code to be read. The assembly position and alignment is predefined by the application not by the code verification. Automated verification reports can be generated and automated reaction times are provided in a timely manner when the code quality degrades.

Preferably the generation of the verification image is limited to image regions with codes (ROI, region of interest). In principle, it is also possible to transform the entire image into a verification image, however, this requires higher calculation capacities.

The image processing for the generation of the normalized verification image preferably comprises at least one of the following measures: a perspective rectification, a brightness correction, a brightness normalization, a size normalization, in particular of code modules, a noise suppression and/or an illumination angle determination. These are possible influences which should be corrected in order to obtain a verification image corresponding to the conventional standardized boundary conditions.

The verification unit is preferably configured to rectify image regions with the aid of a perspective transformation which transforms geometries at an object plane in the detection zone into geometries of the image plane. Independent thereof from which perspective the images are actually recorded by the code reader, an image thus arises from a predefineable norm perspective corresponding to the perspective transformation, for example from a directly orthogonal top view.

The verification unit is preferably configured to modify brightness values of individual pixels or groups of pixels with a correction factor which is calculated from a perspective transformation which transforms geometries at an object plane in the detection zone into geometries of the image plane in order to obtain a uniformly illuminated image. In this connection the perspective transformation is used, in contrast to the previous section, for a geometric rectification, for a brightness correction. This because grey scale value extents arise by deviations from an orthogonal top view onto the object plane with the code, which grey scale value extents are undesirable for the verification image. Correspondingly, correction factors are calculated from the perspective transformations which compensate an inclination of the optical axis of the image sensor. The thereby corrected image is brightness corrected and/or appears homogeneously illuminated in this way and therefore corresponds to an image which is recorded in an imaginary reference situation for normalized, homogeneous illumination from the perpendicular top view. In this way, a code verification is enabled also for a strong inclination of the code reader. The condition(s) for a code verification in accordance with which the code is received from a perpendicular top view no longer has to be physically ensured with the corresponding disadvantages, for example, by reflections, but is satisfied retrospectively by calculation. The correction factors can be calculated during the brightness correction. Preferably, the correction factors are, however, only calculated once in advance and are stored, since these depend on the code reader and its assembly, but not on the specific scenarios and the correspondingly recorded images.

The verification unit is preferably configured to calculate a correction factor from the ratio of the areal content of a part surface of the image plane, in particular by a regular division of the image plane including part surfaces to the areal content of the part surfaces arising in accordance with the respective transformation. In this connection the ratio of the original areal elements of the image plane to the corresponding areal elements after application of the perspective transformation is thus considered. The correction factor can directly be selected as this areal ratio and/or its inverse value. Alternatively, the correction factor is still further modified, for example, in that particularly small areal ratios are weighted over proportionally in order to particularly strongly brighten image regions to a particular degree, which image regions are darkened by the perspective. The part surfaces of the image plane are even more preferably determined by regular division of the image plane, for example into image quadrants. In this connection, the image plane is covered with a screen or a grid. Thereby regular part surfaces arise in the image plane, in particular quadrants of equal size. The application of the respective transformation transfers these quadrants into trapezes. Each pixel within an image quadrant is now brightened or darkened to a certain degree via the correction factor in its brightness which degree corresponds to the areal ratio of the quadrant to the associated trapeze. In this way the energy loss due to an inclination of the object plane, brought about by the perspective of the image sensor and/or of its inclination, is retrospectively compensated by image processing.

The verification unit preferably has an FPGA which multiplies the pixels of a detected image with previously stored correction factors. The determination of the correction factors on the basis of the perspective transformation in this connection takes place once, prior to the actual operation. The correction factors are stored thereafter, for example, in a reference table (lookup table). The demand for the actual brightness correction then reduces to a point-wise multiplication of the pixels with the associated correction factors. Such simple calculation exercises, but calculation exercises to be repeated in very large numbers, possibly in real time, are realized by an FPGA particularly cost-effectively. Alternatively, the brightness correction can be carried out by software at a microcontroller having sufficient performance.

Preferably, a calibration unit is provided which is configured to determine the perspective transformation as that with which a known absolute geometry of a calibration code is transformed into its detected geometry in the image. Due to perspective distortions, the calibration code is generally not recorded such that its actual geometry can be recognized in the recorded image. For example, a rectangular calibration code can be distorted to a trapeze. The absolute geometry, namely the rectangular form possibly including the side ratios or even the absolute dimensions is known in advance be it through general assumptions or parameterizations. Alternatively, this geometry can itself be coded in the calibration code so that it is known to the code reader by a code reading. Thus it is possible to determine the sought after perspective transformation as that transformation which transfers the detected geometry of the calibration code, thus for example a trapeze, into its actual or absolute geometry, namely in this example into a rectangle.

The calibration code does not require any specific properties for the brightness correction, thus, for example, it does not have to be uniformly pure white. For this reason, a simple, calibration code producible in the field which can simultaneously also be used for a different calibration, for example a length calibration or a rectification, is sufficient. A cyclic multi calibration, as for common verification devices, is not required. Since in principle each structure having a known geometry is suitable for this calibration, the apparatus itself preferably recognizes when the calibration, is no longer correct. This is namely the case when a detected geometry, for example, of a code region, no longer corresponds to the expected absolute geometry after application of the perspective transformation. The cause of this could, for example, lie therein that the inclination or position of the code reader has been displaced and for this reason is in the position to demand a renewed calibration or to carry this out directly.

Preferably a distance measuring unit is provided, in particular in accordance with the principle of the determination of the time of flight of light, in order to determine the distance to a read code or to detect an article. Such distance measurements are frequently carried out for an auto focus setting. In this way also the third dimension of the reading distance is made accessible in addition to the other two dimensions of the images, so that the perspective transformation and the required geometric rectification or brightness correction can be determined substantially more precise and can be used.

The verification unit is preferably configured to derive an illumination angle between the image plane and the object plane from the perspective transformation. The angle is a spatial angle which, for example, can be provided in three angular components of the inclination with respect to a reference coordinate system and should be known for certain tests on the code verification.

The verification unit is preferably configured to carry out a brightness correction with boundary loss correction factors which compensate a known or assumed brightness loss of the image sensor in its boundary regions. These boundary losses typically follow a $\cos^4$ law. In a verification image having boundary loss correction the verification is position independent, this means that one does not have to monitor whether the code is present in the image center. Correspondingly, by the same token a boundary loss correction can be omitted, when it is otherwise ensured that no code can be read or verified in the boundary regions of the image. The boundary loss can be corrected in addition to the perspective brightness distortion. In a similar way also other additional effects with respect to the brightness distribution can be corrected in further steps. Preferably, the correction factors are matched merely once in order to also consider the boundary loss or a different effect so that during operation no additional effort is required in order to further improve the brightness correction.

The verification unit is preferably configured to determine a mean value of the brightness values of bright code elements, to calculate a normalization factor from the ratio of the mean value to a desired mean value and to normalize the brightness of the code region in that its brightness is matched to the normalization factor. In this way, the verification image is brightness normalized. The differentiation of bright code elements with respect to darker code elements has to be carried out in any way by the code reader in order to read codes, for example, during a binarization for the determination of the global or local binarization threshold. The mean value of the brightness pixels of the bright code region is a measure for the brightness of the code, this brightness should be determined for the verification image, for example, in a range of 70%-86% of the maximum brightness in that bright code regions are securely recognized as such, without otherwise over modulating. For an 8 bit coding of the brightness one can, for example, set the desired mean value to 200, since then the ratio to the maximum brightness value at 255, corresponding to approximately 78% of the brightness value, even lies in the middle of the desired interval.

The verification unit is preferably configured to rescale the code regions by an interpolation of the detected image data such that all code modules have a minimum size. Thus, as far as a code module was initially recorded as too small, for example, due to a large reading distance or a particularly large inclination, edges are recognized in the sub pixel region by interpolation and based thereon the code modules can be increased in order to obtain the minimum size. Following this size normalization the verification image satisfies a further standardization requirement.

The verification unit is preferably configured to determine a characteristic number for an image noise in the code region and to smooth the image of the code region with a filter which is parameterized in accordance with the characteristic number. The characteristic number can be derived from dimensions of the images itself, for example its contrast, in particular at bright dark transitions of code elements, or from the recording system, for example, the illumination time of the image sensor or an amplification factor of its signal. Depending on how strong the noise is in accordance with the characteristic number a smoothness filter, such as a medium filter, is then correspondingly parameterized. In the verification image the noise is then suppressed to an appropriate degree.

The verification unit is preferably configured to generate and/or to evaluate a verification image in parallel to the decoding of the code content in the decoding unit. The verification thus takes place in the production operation. For this purpose a background process can be provided which carries out a verification only with calculation capacities which remain open during the overriding actual operation with reading of the codes or a real parallel process. Depending on how much calculation capacity is made available for the verification this takes place on a random sample basis or even for each read code. It is plausible to provide a rate of how many of the read codes can also be verified. More precisely two such rates can be provided: firstly a rate of how many codes have been subjected to a verification, and secondly a rate of how many codes have successfully been verified, wherein the latter can also be extrapolated from a sample probe. As an alternative, an exclusive mode of the code reader is respectively provided in which codes are either read or codes are verified. It is also plausible to carry out the image processing for the generation of the verification image for each code as a kind of pre-processing. Thereafter, on the one hand, the decoding unit attempts to read the code on the basis of the verification image, possibly in addition to a reading attempt of the original image data of the code region and, on the other hand the verification unit subjects the code to a quality control.

The method in accordance with the invention can be further developed in a similar manner and in this respect shows similar advantages. Such advantageous features are described purely by way of example, but not conclusively in the dependent claims adjoining the independent claims.

Figure 2:
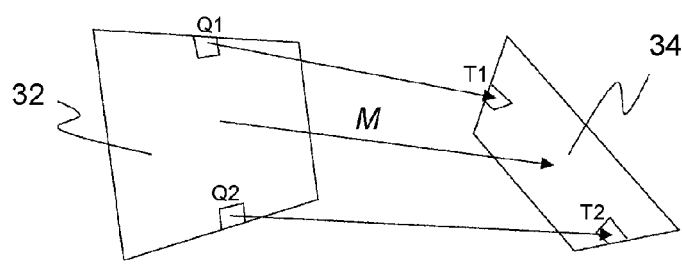
Figure 3A:
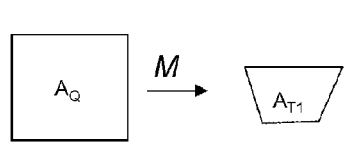
Figure 3B:
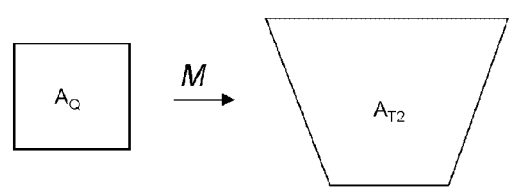
Figure 4:
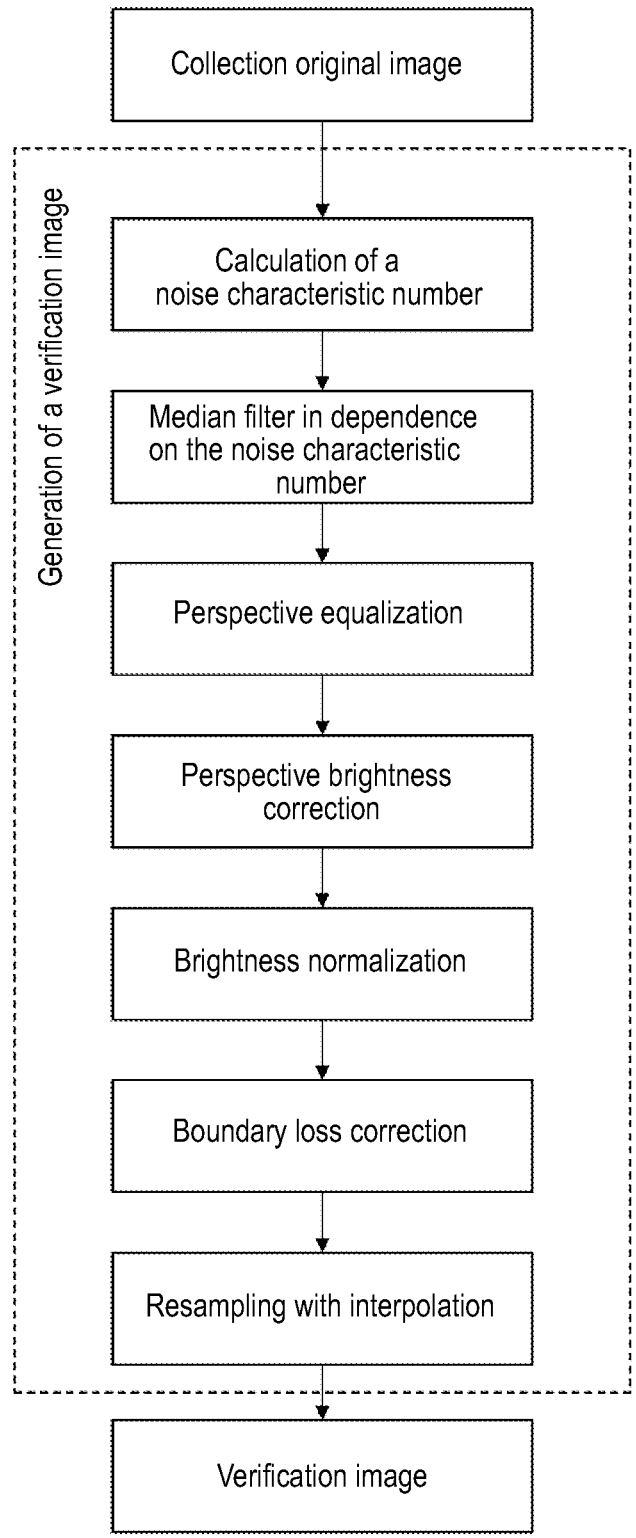

The invention will be described in detail in the following by way of example, also with regard to further features and advantages by means of embodiments and with reference to the submitted drawing. The illustrations of the drawing show:

FIG. 1 a schematic sectional illustration of a camera-based code reader;

FIG. 2 a schematic illustration of the perspective transformation between object plane and image plane;

FIG. 3a-b a respective schematic illustration of the transformation of an image quadrant of the image plane to a smaller and a larger trapeze in the object plane; and FIG. 4 an exemplary flow diagram of the steps carried out on the generation of a verification image.

FIG. 1 shows a schematic sectional illustration of a camera-based code reader 10. The code reader 10 records images from a detection zone 12 in which arbitrary objects with codes 14 can be present. The light from the detection zone 12 is received by a reception lens 16 in which only one illustrated lens 18 represents the reception optical system. An image sensor 20, for example, a CCD or CMOS chip having a plurality of pixel elements arranged to a row or a matrix, generate image data of the detection zone 12 and provide these as a whole to an evaluation unit referred to with reference numeral 22. For a better detection of the code 14 the code reader 10 can be equipped with a non-illustrated active illumination.

The evaluation unit 22 is implemented on one or more digital components, for example micro processes, ASICs, FPGAs or the like which can also totally or partly be provided outside of the code reader 10. Illustrated are not the physical, but rather the functional modules of the evaluation unit 22, namely a decoding unit 24, a calibration unit 26 and a verification unit 28.

The decoding unit 24 is in the position to decode codes 14, this means it should read the information included in the codes 14. Illustrated by way of example of FIG. 1 is a data matrix code. Likewise, however, also arbitrary different one or two-dimensional code types can be processed, as long as corresponding reading methods are implemented in the decoding unit 24. One-dimensional codes are typically barcodes. A few non-conclusive examples for established two-dimensional codes are DataMatrix, QR code, Aztec code, PDF417 or MaxiCode. The decoding can be preceded by a preprocessing in which regions of interest (ROI) within the images of the image sensor 20 can be identified with therein assumed codes 14 or recognized codes 14 which images are binarized or the like.

The calibration unit 26 serves for a calibration of the code reader 10, with, in particular the recognition and correction of a perspective and especially of an inclination or skew of the image sensor 20 with respect to an object plane of the code 14 being relevant in this connection. The determination of a corresponding perspective transformation M will be explained in more detail in the following with reference to FIG. 2.

The verification unit 28 is in the position to generate a verification image with standardized properties from an input image by different processing steps. In this connection, effects are subtracted out by software algorithms which, for example, arise due to the installed camera angle of the code reader 10, the reading distance, the lens 18, shutter times and the like. Plausible image processing steps in this regard are a perspective rectification, a brightness correction, a brightness normalization, a size normalization, a noise suppression or an illumination angle determination. The result is a verification image which comes so close to the image insertion of an offline verification device having fixed physical boundary conditions at least so close that the measurement results in accordance with the relevant ISO norms in a transverse comparison at least show no or insignificant deviations. The verification image can also be used for a (further) code reading in the decoding unit 24 in order to increase the reading rate.

At an output 30 of the code reader 10 data can be output, for example, results of code verifications, read code information or also image data in different processing steps.

In the following the image processing steps will be explained individually. In principle, it is sufficient to limit the image processing to code regions 14 which were identified in a preprocessing step in order to limit the calculation demand.

Images of the code 14 are regularly distorted due to the recording perspective. This is because the alignment is frequently not orthogonal, in other words, the optical axis of the lens of the image sensor 20 includes an angle with respect to a normal of an object plane of the code 14 to be read which angle is unequal to zero. Such a tilted orientation of the code reader 10 is desired due to the constructional circumstances in the application, the aim of reading codes 14 from all directions and, for example, which is also desired in order not to reflect too much light back into the image sensor 20 for bright surfaces. In this way, however, perspective distortions arise which violate requirements on a verification image and additionally also bring about an inhomogeneous brightness distribution or grey scale value ramps respectively. These perspective effects can be compensated with a part of the balanced image processing on the generation of the verification image.

For this purpose FIG. 2 purely by way of example illustrates the image plane 32 of the image sensor 20 and the object plane 34 of the code 14 for a given orientation of the code reader 10 with respect to the code 14. In the general case, the image plane 32 and the object plane 34 are not parallel to one another and the corresponding angle of inclination of the code reader 10 with respect to the object plane 34 ensures the discussed perspective distortion.

Through a calibration, the matrix M of the perspective transformation or its inverse can be determined which transfers geometries of the image plane 32 into the geometries of the object plane 34. For this purpose, for example, an arbitrary rectangular code is presented as a calibration code. Other geometries of the calibration code are also plausible, as long as the calibration unit 26 knows these geometries or, for example, learns these by reading a corresponding code content of the calibration code.

Through reading the calibration code in the decoding unit 24 the positions of the four edge points of the calibration code 100 are known with a large accuracy. In the calibration unit 26 a transformation is now calculated, for example, via the image matrix M which transfers the edge points of the distortedly recorded calibration code into the actual geometry of a rectangle. The image matrix M is a perspective transformation which can include a rotation, a translation and a rescaling. So far as also the absolute dimensions of the calibration code are known the transformation is dimensionally true. These dimensions can likewise be predefined, parameterized or read from the code content of the calibration code which, for example, includes a clear text with its dimensions: "calibration code, rectangular, 3 cm×4 cm". Without this additional information on the absolute dimensions an unknown scaling factor of the matrix M still remains.

The transformation provision M determined once during a calibration process keeps its validity only for so long, as the code reader 10 remains in its perspective with respect to the codes 14 to be read. In that an arbitrary code 14 is considered during the operation as a calibration code it can be checked whether the calibration is still true. For this purpose, the transformation M is applied to a code 14 and it is checked whether its edge points still form an expected rectangle.

Due to the calibration a perspective transformation M is thus known which determines how an arbitrary geometry at the object plane 34, this means a planar surface from which the calibration code is read, is imaged onto the image plane 32 and vice versa. This knowledge can then be used in order to rectify image regions with codes 14 perspectively. Instead of determining the perspective transformation by a calibration it can alternatively also be input or be calculated from a model with the aid of parameters to be determined, such as the angle of inclination of the code reader 10 and the orientation of the object plane 34 from a model.

The perspective transformation M is moreover used for a brightness correction. The basic consideration for this purpose is to consider the image plane 32 as a homogeneous areal radiator which irradiates the object plane 34 and to consider the distribution of the photons at the surface in the object plane. This areal radiator is divided into equal sized squares having an areal content $A_Q$, wherein FIG. 2 shows two such squares Q1 and Q2 by way of example. The perspective transformation M for each geometry of the image plane and in this way also for the squares Q1 and Q2, provides the corresponding geometries in the object plane 34, namely trapezes T1 and T2.

Depending on whether the square Q1, Q2 is present in the image plane 32 a different sized trapeze T1, T2 arises as a part region of the object plane 34. This is schematically shown in the FIGS. 3a, 3b, on the one hand, for the case of a smaller arising trapeze with areal content $A_{T1}$ and, on the other hand, for the case of a larger arising trapeze with areal content $A_{T2}$.

The squares Q1, Q2 in the image plane 32 are of the same size amongst one another and in the imaginary consideration of the image plane 32 correspond to an areal radiator irradiating an equal amount of radiated energy or photons in the direction of the object plane 34. In a slightly simplified manner one can assume that this irradiated energy also completely arrives at the object plane 34. The number of photons, which are incident per unit time on a trapeze T1, T2 of the object plane 34, for this reason only depends on the areal content of the trapeze T1, T2. If the area of the trapeze T1, T2 is larger than the output surface of the square Q1, Q2, then the same number of photons is distributed on a larger surface, so that the object plane surface becomes darker than the image plane square. Correspondingly, a larger photon density arises for a smaller surface of the trapezes T1, T2, such a surface must therefore appear more bright.

This connection between brightness and areal conditions of the image plane 32 and of the object plane 34 is utilized by the verification unit 28. In accordance with the model considerations it is sufficient to consider the areal ratio of the square Q1, Q2 to the trapeze T1, T2 arising in accordance with the perspective transformation M for a brightness correction. These correction factors can, for example, be directly multiplied pixel-wise at the grey scale values of the input image delivered by the image sensor 20 in order to obtain the brightness corrected image.

Expressed in a formal manner, a trapeze T with areal content $A_{T(x,y)}$ arises for an image plane square Q at the position x, y with areal content $A_{Q(x,y)}$ from a transformation and the correction value to be multiplied for the pixels included in the image plane square Q or their grey scale values is calculated by $H_{mul} = A_{Q(x,y)} / A_{T(x,y)}$. The smaller the areal content of the square Q is selected in the image plane 32 in this connection the fewer pixels are therefore treated in a group with a common correction factor, the more uniform the brightness correction is.

If the matrix M has once been determined in the calibration, then the correction factors can also be calculated therefrom. The brightness correction itself is then only a pointwise multiplication using constants. Particularly for the last mentioned operation the implementation of the brightness correction is suitable on an FPGA which calculates the multiplications in real time, for example with the aid of a lookup table, and in this way unburdens a kernel CPU of the evaluation unit 22.

Other than by the perspective the brightness can also be distorted by further effects, for example, by a boundary loss through the recording lens 16. This boundary loss generally follows a known $\cos^4$ relationship. However, also independent of regularities, further correction factors can be calculated in order to compensate such effects on the brightness. Then either the further correction factors are multiplied in an own step with the brightness values of the pixels, or the above-mentioned correction factors are modified or calculated by way of multiplication respectively in order to consider a boundary loss or further effects in addition to a perspective brightness distortion. Following a boundary loss correction it is no longer required that the verified code 14 lies in the image center.

The so far presented brightness correction ensures a homogeneous brightness distribution which corresponds to a standardized recording and/or illumination from an orthogonal perspective. Nevertheless, the recording can totally still remain too dark or too bright. In order to rectify this a brightness normalization is provided. A provision with respect to the reflection calibration for the verification can, for example, lie therein to set the system answer, for example, on the illumination time (shutter) and amplification such that a mean value of bright code elements is present in a range of 70%-86% of the overall grey scale values or of the highest reflection. Correspondingly, a normalization factor is searched for in the image processing which is multiplied with all pixels so that such a mean value is achieved. An example is a grey scale value of 200 for an 8 bit grey scale coding or any other value in the searched for interval of 70% to 86% of the maximum grey scale value of 255. Practically a histogram is formed for this purpose for the estimation of the grey scale value distribution, in particular once the perspective rectification and the brightness correction has been carried out. By means of the histogram a mean value of the grey scale value of the bright code elements is determined and the normalization factor is then found by the formation of quotients having the desired mean value. Through multiplication of the grey scale values of the image with the normalization factor, signals and contrasts are increased or decreased in the verification image to the desired brightness normalized level.

A further influence on the image is exerted by noise whose intensity amongst other things depends on the shutter or illumination times, the camera amplification and the position of focus. For an online verification in the application also such parameters can be selected non constant in accordance with a standard, but these are rather determined by reading the code 14 currently to be detected as reliable as possible. However, it is also possible to derive a characteristic number from the significant recording parameters, as well as by examining the inlet image itself, for example its contrast precisely in the transitions between bright and dark code regions, which characteristic number evaluates the strength of the noise. This characteristic number serves the purpose of selecting a suitable smoothness filter, for example a median filter alternatively to suitably parameterize such a filter in dependence on the characteristic numbers. After application of the smoothness filter on the verification image a reduced image noise is thereby achieved which is starkly independent form the individual noise level.

For the verification a minimum size per code module or code bar is further required. In order to ensure this minimum size in accordance with the ISO norms an interpolation method is also preferably implemented in the verification unit 28, for example, a bi-cubic interpolation by means of which the verification image is scanned again with increased resolution (resampling). By means of such technology edges can be localized with an accuracy of at least ¹⁄₁₀ pixels on code reading. For this reason only information is used by the resampling which is included itself in the grey scale extent and a zoom effect is achieved as a result in which the resolution of the code region 14 in pixels is increased with a factor corresponding to the interpolation accuracy. In this way also codes 14 having very small modular cells can be verified, this because the module cells are either actually printed very small or because they are recorded at a large distance. A common verification device having a fixed distance between a code and an image plane in contrast can only verify very small code modules in accordance with ISO, when the resolution is correspondingly increased through an exchange of the camera module.

A few norms such as the AIM-PDM for directly impressed codes (DPM, direct part marking) require, on the verification, additional knowledge on the illumination angle. This angle is a spatial angle which is to be provided in a plurality of coordinates in dependence on the reference system. Since the code reader 10 generally has an own internal illumination the angle of the optical axis of the code reader 10 and the illumination angle frequently coincide. In this way the illumination angle can be derived from the perspective transformation M, for example, in that it is calculated at which angle the optical axis of the code reader 10 is with regard to transformation.

FIG. 4 again shows in summary a possible sequence of the individual image processing steps. The most image processing steps can be exchanged in their sequence, so that the sequence shown in FIG. 4 does not necessarily correspond to the sequence of the explanations of the individual steps.

The verification unit 28 can be operated in an exclusive mode of operation or in a parallel mode of operation. In the exclusive mode of operation the code reader 10 momentarily switches from the reading mode into the verification mode. As soon as a trigger for an object to be detected is released in the plant at which the code reader 10 is mounted, an image collection is started up until a first code 14 has been read. Further triggers are then no longer accepted up to end of the verification. After a successful reading of the code 14 the code region is perspectively rectified and a brightness correction and brightness normalization is carried out. As far as it is necessary, also the boundary loss is corrected. If the module size or bar thickness does not correspond to the norm requirements, the resolution of the verification image is increased in a resampling by means of interpolation technology. As far as the applied norm should know the illumination angle, as is the case with the AIM-DPM, then the angle between the object plane 34 and the image plane 32 is calculated from the perspective transformation M. If stronger image noise is present, then a smoothness filter, selected in accordance with a noise classification number, is used. Thereafter the verification image is made available and the assessment of the code quality, as prescribed by the norm, can be carried out in a conventional manner.

For sufficient calculation capacities of the evaluation unit 22 verification images can be generated in a real parallel mode of operation for all detected codes 14. The code 14 is decoded in a reading process and indeed from the original image, possibly following an own processing from the verification image or redundant from two image sources. A verification process runs in parallel to the reading process in which verification process the verification images are generated as described above for the exclusive mode of operation and the codes 14 are subsequently verified on this basis.

If the calculation capacity is not sufficient for such a real parallel mode of operation then the image region of the code 14 is copied after an online reading having taken place in a parallel working background process. This background process differs form the real parallel verification process especially thereby that only those calculation capacities are made available therefore which are left over by the primary reading process. The background process in particular uses times of object gaps and/or reading gate gaps for this purpose in which no online decoding is possible or required and in which also no new image collecting typically takes place. In this case the load of the overall system without verification in this way determines the quota of codes 14 which can be verified. Since the online decoding is overriding, the portion of verified codes 14 can also remain very small. This amongst other things depends on the frequency and length of the reading gate, i.e. the duration of the phases with objects and codes 14 to be detected in the detection zone 12 by the code reader 10.

The verification results can be read out via the output 30, stored at a memory medium or be displayed at the code reader 10. A verification report, for example, includes a log file with all verification results or preparations thereof, for example, a diagram of the last 24 hours as a verification curve having an hourly entry from the averaged values of all of the verification having taken place in this hour. The output of a quote is also plausible with respect to how many codes 14 have been subjected to a verification by a background process with respect to the overall number of codes 14 read and how many verified codes 14 have satisfied the quality requirements.

A desired reaction on the verification can also be switched directly at the output 30 or at a further output. For example, a downstream actor can be assigned to sort out objects with codes 14 of insufficient quality from a feed process. In this connection it must however be considered that the code 14 may possibly already have left the detection zone due to the high calculation demand for the verification of the code 14 before the verification result is present. Slightly less demands are placed on the reaction time when the code quality continuously decreases and if one should not only interact with the process in a correcting manner with respect to one article, but totally.

The verification image can be distorted by further effects which have so far not been discussed. Possible causes are movement blurring, when the codes are moving relative with respect to the code reader 10 whilst reading, very short shutter or illumination times, which increase the image noise, or also further optical properties of the code reader 10. It is plausible to additionally consider such effects and to remove their artifacts by a correspondingly more advanced image processing.

The invention claimed is:

1. A code reader (10) comprising
an image sensor (20) for the generation of images of a detection zone (12) resolved in pixels,
a decoding unit (24) in order to identify code regions (14) in the images and to read out their coded information, as well as
a verification unit (28) for evaluating the code quality in order to classify the code with respect to different quality criteria predefined by standards or to ensure, based on the criteria of the standards, that the code has at least a predefined code quality,
wherein the verification unit (28) is configured to initially generate a normalized verification image of the code from the code regions (14) by means of image processing for the verification, wherein the normalized verification image corresponds to an image of an offline verification device having fixed physical boundary conditions and to thus achieve quality control of the code in accordance with accepted standards comparable to the offline verification device.

2. A code reader in accordance with claim 1, wherein said code reader is configured as a camera-based code reader.

3. A code reader (10) in accordance with claim 1, wherein the image processing comprises at least one of the following measures on the generation of the normalized verification image: a perspective rectification, a brightness correction, a brightness normalization, a size normalization, a noise suppression and an illumination angle determination.

4. A code reader (10) in accordance with claim 1, wherein the verification unit (28) is configured to rectify image regions with the aid of a perspective transformation (M) which transforms geometries at the object plane (34) in the detection zone (12) into geometries of the image plane (32).

5. A code reader (10) in accordance with claim 1, wherein the verification unit (28) is configured to modify brightness values of individual pixels or groups of pixels with a correction factor which is calculated from a perspective transformation (M) which transforms geometries at the object plane (34) in the detection zone (12) into geometries of the image plane (32) in order to obtain a uniformly illuminated image.

6. A code reader (10) in accordance with claim 5, wherein the verification unit (28) is configured to calculate a correction factor from the ratio of an areal content ($A_{Q1}$, $A_{Q2}$) of a part surface (Q1, Q2) of the image plane (32) to an areal content ($A_{T1}$, $A_{T2}$) of part surfaces (T1, T2) arising in accordance with the perspective transformation (M).

7. A code reader (10) in accordance with claim 6, wherein said part surface (Q) of the image plane is obtained by regular division of the image plane (32).

8. A code reader (10) in accordance with claim 4, further comprising a calibration unit (26) configured to determine the perspective transformation (M) as that by means of which a known absolute geometry of a calibration code is transformed into the image by its detected geometry.

9. A code reader (10) in accordance with claim 4, wherein the verification unit (28) is configured to derive a spatial angle between the image plane (32) and the object plane (34) from the perspective transformation (M).

10. A code reader (10) in accordance with claim 1, wherein the verification unit (28) is configured to carry out a brightness correction with boundary loss correction factors which compensate a known or assumed brightness loss of the image sensor (20) boundary regions of the image sensor.

11. A code reader (10) in accordance with claim 1, wherein the verification unit (28) is configured to determine a mean value of the brightness values of bright code elements, to calculate a normalization factor from the ratio of the mean value to a desired mean value and to normalize the brightness of the code region (14) in that its brightness is matched using the normalization factor.

12. A code reader (10) in accordance with claim 1, wherein the verification unit (28) is configured to rescale the code regions (14) by interpolation of detected image data such that all code modules have a minimum size.

13. A code reader (10) in accordance with claim 1, wherein the verification unit (28) is configured to determine a characteristic number for image noise in the code region (14) and to smooth the image of the code region (14) with a filter which is parameterized in accordance with the characteristic number.

14. A code reader (10) in accordance with claim 1, wherein the verification unit (28) is configured to generate and/or to evaluate a verification image in parallel to the decoding of the code content in the decoding unit (24).

15. A method for online verification of a code (14) which is detected by an image sensor (20) of a code reader (10) in an image resolved in pixels, wherein the coded information of the code (14) is read out and a quality of the code is evaluated in order to classify the code with respect to different quality criteria predefined by standards or to ensure, based on the criteria of the standards, that the code has at least a predefined code quality,
comprising the step of initially generating a normalized verification image of the code (14) from the image by means of image processing for the verification, wherein the normalized verification image corresponds to an image of an offline verification device having fixed physical boundary conditions and to thus achieve quality control of the code in accordance with accepted standards comparable to the offline verification device.

16. A method in accordance with claim 15, wherein the image processing comprises at least one of the following measures on the generation of the normalized verification image: a perspective rectification, a brightness correction, a brightness normalization, a size normalization a noise suppression and a spatial angular determination.

17. A method in accordance with claim 15, wherein a perspective transformation (M) is determined which calculates geometries at an object plane (34) in the detection zone (12) into geometries of the image plane (32) and wherein the image is rectified with the aid of perspective transformation (M) and its brightness is corrected.

* * * * *